US010237372B2

(12) United States Patent
Baird (10) Patent No.: US 10,237,372 B2
(45) Date of Patent: Mar. 19, 2019

(54) SCALABLE PROGRAMMING ARCHITECTURE FOR TELECOMMUNICATIONS DEVICES

(71) Applicant: ADTRAN, INC., Huntsville, AL (US)

(72) Inventor: Keith Baird, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 137 days.

(21) Appl. No.: 15/583,000

(22) Filed: May 1, 2017

(65) Prior Publication Data

US 2018/0316780 A1    Nov. 1, 2018

(51) Int. Cl.
| H04L 29/06 | (2006.01) |
| H04L 12/24 | (2006.01) |
| H04L 29/08 | (2006.01) |
| G06F 9/54  | (2006.01) |
| G06F 9/448 | (2018.01) |

(52) U.S. Cl.
CPC ............ *H04L 67/40* (2013.01); *G06F 9/4488* (2018.02); *G06F 9/546* (2013.01); *G06F 9/547* (2013.01); *H04L 41/0816* (2013.01); *H04L 67/10* (2013.01); *H04L 67/327* (2013.01)

(58) Field of Classification Search
CPC ..... H04L 67/40; H04L 41/0816; H04L 67/10; H04L 67/327; G06F 9/4488; G06F 9/546; G06F 9/547
See application file for complete search history.

(56) References Cited

U.S. PATENT DOCUMENTS

| 7,461,374 | B1 * | 12/2008 | Balint | ..................... G06F 8/658 |
| | | | | 717/174 |
| 8,689,181 | B2 * | 4/2014 | Biron, III | ............ G06F 9/45512 |
| | | | | 717/115 |
| 9,948,644 | B2 * | 4/2018 | Brouk | ................. H04L 63/0884 |
| 2005/0086297 | A1 * | 4/2005 | Hinks | ..................... H04L 67/02 |
| | | | | 709/203 |
| 2007/0050519 | A1 * | 3/2007 | Cano | ................... H04L 67/1095 |
| | | | | 709/238 |
| 2007/0101258 | A1 * | 5/2007 | Xu | ..................... G06F 17/30893 |
| | | | | 715/234 |

* cited by examiner

*Primary Examiner* — Jerry B Dennison
(74) *Attorney, Agent, or Firm* — Fish & Richardson P.C.

(57) ABSTRACT

Methods, systems, and apparatus, including computer programs encoded on a computer storage medium, for managing operation of telecommunications devices. In one aspect, a method includes actions of executing a container program that lacks scripts that manage operation of telecommunications devices that interact with a cloud platform, monitoring messages generated by the telecommunications, filtering the messages to select a subset of messages that trigger execution of the scripts by the container program, identifying, for each selected message in the subset of messages and from an index of available scripts, a particular script that is executed in response to receipt of the selected message, merging each particular script with the container program to create a management program that manages operation of the telecommunications devices based on the subset of messages, and managing operation of the telecommunications devices with the management program.

20 Claims, 5 Drawing Sheets

SCALABLE PROGRAMMING ARCHITECTURE FOR TELECOMMUNICATIONS DEVICES

BACKGROUND

This document relates to a scalable programming architecture for telecommunications devices. Current telecommunications network management solutions offer either high performance programming languages (e.g., functional programming languages) that emphasize reliability and concurrency, but lack flexibility, or scripting languages that emphasize clear syntax, readability and are easily modified for new customer applications where performance and parallel execution are a nonissue. When high performance network management solutions are required, software development is time-consuming because it is not data-driven.

In high performance network management solutions, software development requires transformations that need to be coded using a high performance programming language for each different application (e.g., combinations of features for various network operators) used in managing the network. The software may need to be updated frequently to add new applications or maintain existing applications. Over the life cycle of devices in the network, the software becomes increasingly difficult to change, and increasingly susceptible to faults.

SUMMARY

One innovative aspect of the subject matter described in this specification is embodied in methods that include the actions of executing, by one or more computing devices, a container program that lacks one or more scripts that manage operation of telecommunications devices that interact with a cloud platform, monitoring, by the one or more computing devices, a plurality of messages generated by the telecommunications devices that interact with the cloud platform, and filtering, by the one or more computing devices, the plurality of messages to select, from the plurality of messages, a subset of messages that trigger execution of the one or more scripts by the container program. The methods also include the actions of identifying, for each selected message in the subset of messages and from an index of available scripts, a particular script that is executed in response to receipt of the selected message, wherein different particular scripts are identified for different message types, merging each particular script with the container program to create a management program that manages operation of the telecommunications devices based on the subset of messages, and managing, by the one or more computing devices, operation of the telecommunications devices with the management program.

Other implementations of this and other aspects include corresponding systems, apparatus, and computer programs, configured to perform the actions of the methods, encoded on computer storage devices.

Implementations may each optionally include one or more of the following features. For instance, the methods can generate a response to one or more of the selected messages in the subset of messages, transform the response to the one or more of the selected messages into a particular format, and provide the transformed response to the one or more of the selected messages to one or more of a peer computing device (e.g., one or more different computing devices in the network that can perform various operations) or a particular telecommunications device. In this instance, the response to the one or more selected messages can include a configuration response that modifies one or more parameters of the particular telecommunications device. Further, the response to the one or more selected messages can include a query that gathers data from one or more of the peer computing device or the particular telecommunications device. One or more of the peer computing devices can be used to implement a micro-service architecture.

The methods can include the actions of obtaining the plurality of messages through a network interface that facilitates communication between the telecommunications devices and the cloud platform. Additionally, the methods can include the actions of selectively storing the subset of messages that trigger execution of the one or more scripts by the container program and discarding other received messages. In some aspects, the methods can include that actions of identifying the particular scripts that are executed in response to receipt of the selected messages in parallel. The methods may include the actions of identifying at least one of a topology configuration script, an event relay script, a channel identification script, a telecommunication device performance identification script, or an alarm response script.

The methods can include the actions of generating, for each particular script, an object notation that corresponds to a service request. In this instance, the methods can include the actions of, in response to generating the object notation that corresponds to the service request, rendering the object notation using strings and values extracted from the subset of messages that trigger execution of the one or more scripts by the container program. Further, the methods can include the actions of providing the rendered object notation that corresponds to the service request to one or more a peer computing device or a particular telecommunications device for execution.

Additionally, the methods can include the actions of generating, for each particular script, (i) a response queue identifier and (ii) a response path uniform resource identifier (URI) address, and performing an operation associated with a micro-service using (i) the response queue identifier and (ii) the response path URI address. In this instance, the methods can include the actions of performing a remote procedure call (RPC) to one or more peer computing devices that provide the micro-service for data that identifies a type of telecommunications device to be configured, a service to be configured, and an interface to be configured. Further, the methods can include the actions of extracting, for at least one of the plurality of messages, data identifying the type of telecommunications device to be configured, the service to be configured, and the interface to be configured.

Advantageous implementations can include one or more of the following features. The systems and methods of the present disclosure may be used to manage telecommunications device operations by calling scripts that are identified to be associated with messages of telecommunications devices. In some aspects, the systems execute a container program that is configurable without recompiling. The systems can monitor multiple messages to perform filtering of the messages in parallel. The systems may dynamically select certain messages, and disregard other messages based on data extracted from the messages. The systems can identify scripts for each of the selected messages and call the identified scripts in parallel. The systems provide many advantages of scripting languages that emphasize clear syntax, readability, and easy modifications for various applications. For example, the systems can use a reliable, high-performance functional programming language that supports concurrency. The systems can handle different types of messages of various types of telecommunications devices. The different types of messages may be handled using a common interface that can be modified and reused in various network management applications.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Methods of the present disclosure include actions for managing operation of IP-Managed devices (e.g., devices that are managed over an IP network, such as telecommunications devices) using a flexible and scalable programming architecture that combines advantages provided by high performance programming languages and scripting languages. For example, a computing device executing a container program can use messages received from IP-Managed devices in the network to be dynamically reconfigured using various scripts that are used to process and/or respond to the messages. IP-Managed devices include telecommunications devices that operate in a telecommunications network. For purposes of example, the description that follows will describe technologies for managing operation of IP-Managed devices with reference to telecommunications devices that operate in a telecommunications environment. However, the following techniques can be implemented to manage various other IP-Managed devices.

In a telecommunications environment (and other network environments), there are a tremendous amount of messages that are generated by the various devices, and therefore received by a computing device that is managing operation of the network, but not all of those messages are triggers for the computing device to take action. Therefore, the computing device can filter the messages, and select a subset of messages for processing. Furthermore, the types of messages that are triggers for taking action can vary on a per network operator basis (or some other basis), and the actions taken in response to a particular type of message may vary on a per network operator basis. Therefore, the filtering function needs to be customizable for each of the network operators, and the actions that are taken in response to a particular type of message similarly needs to be flexible. In some implementations, the filtering criteria enable many of the messages received by the computing device to be ignored so that processing resources of the computing device are available to process those messages that satisfy the filtering criteria (e.g., are not ignored), thus improving the performance of the computing device.

As described in more detail throughout this document, the flexibility required for effectively and efficiently managing telecommunications devices for multiple different network operators can be provided using a programming architecture that utilizes a container program that is dynamically reconfigured based on the type of message received, the type of device the message is received from, and/or the network operator for whom the device is being managed.

The combination of the container program and the scripts that are called by the container program is referred to as a management program, which provides a scalable programming architecture for the management of telecommunications devices for various different network operators. The management program enables many different operations to be carried out in parallel and reduces the amount of memory required to perform those operations (e.g., relative to the required if implemented using a functional programming language alone). For example, in some implementations, each micro-service implemented in a functional programming language can require 200 Mbytes of Random Access Memory (RAM) or more, whereas implementing a single micro-service and loading additional scripts requires much less RAM (e.g., 10 Mbytes for each additional script). Thus, the management program described herein provides more scalability than that of a comparable program coded using the functional programming language alone.

In addition to the foregoing, implementing various separate micro-services enables micro-services to be updated without changing the code of the container program, thereby reducing the likelihood that a change will cause errors in the container program and/or other scripts.

In operation, each of the messages that satisfy the filter criteria (e.g., are not ignored), are used by the computing device, individually or in parallel, to identify a script (or plugin) that is required to be executed in response to receipt of the message. For example, the computing device can use an index of available scripts to identify a particular script that is mapped to a particular received message in the index. The computing device can then make a call for the particular script, and merge that script into the container program, and then execute that script. The execution of the script may cause the computing device to make further calls for additional scripts or additional information that is used by the script, and the scripts or information obtained through those calls can be similarly merged into the container program as part of the management program.

Figure 1:
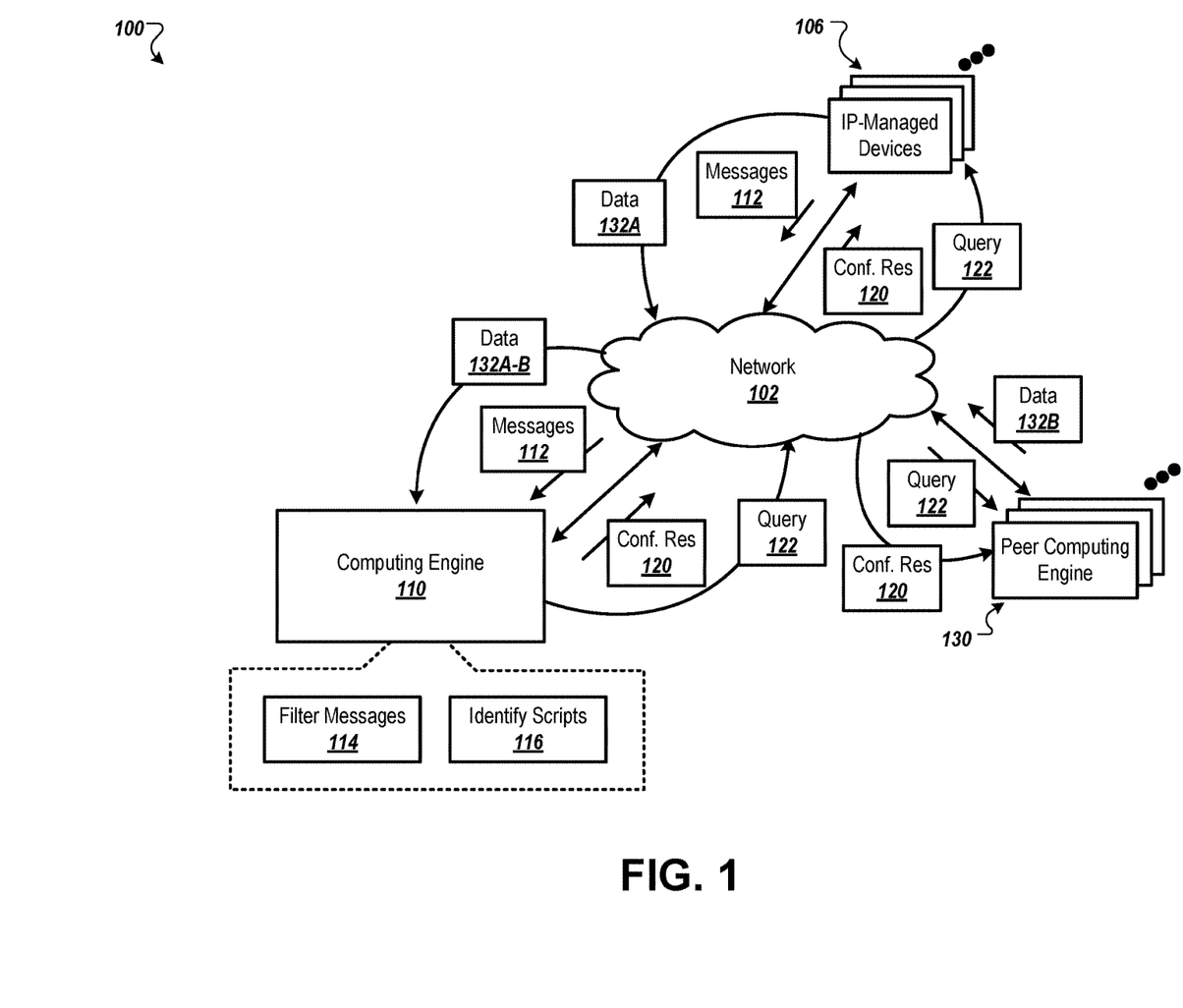
FIG. 1 is a diagram of an example environment in which operations of IP-Managed devices are managed using a management program.

FIG. 1 is a diagram of an example environment 100 in which operations of IP-Managed devices are managed using a management program. The environment 100 includes a network 102, such as a local area network (LAN), a wide area network (WAN), the Internet, or any combination thereof. The network 102 connects IP-Managed devices 106, a computing engine 110, and peer computing engines 130. The example environment 100 may include many different IP-Managed devices 106, computing engines 110 and peer computing engines 130.

The IP-Managed devices 106 can include one or more IP-Managed devices such as telecommunications devices, network interface devices, optical network units (ONUs), network operator equipment, consumer premises equipment, and the like. The IP-Managed devices 106 are distributed across the network 102. The IP-Managed devices 106 generate and transmit messages 112 across the network 102. The IP-Managed devices 106 may transmit messages 112 to a computing engine 110, (e.g., a computing device, a server, etc.), which may be part of a cloud platform, such as a network functional virtualization (NFV) platform as a service (PAAS).

The messages 112 may include information such as a status update of a particular telecommunications device, alarms, notifications, log data, raw messages indicating a condition of particular telecommunications device, and the like. For example, the messages 112 can include messages specifying faults, configuration information (e.g., channel ID), performance information, information about the security of the IP-Managed devices 106, and/or other information that can be used to take action related to the management of the IP-Managed devices 106.

The IP-Managed devices 106 may be configured to transmit the messages 112 automatically or the IP-Managed devices 106 can be polled for information (e.g., by the computing engine 110). For example, a particular telecommunications device may transmit status update notifications periodically (e.g., every minute, every hour, every day), or as requested by the computing engine 110. The status update notification, as well as other types of messages, may be transmitted to a predetermined destination address of another telecommunications device over the network 102. In route to the destination address, the status update notification may be forwarded as a packet over various IP-Managed devices 106 before reaching the destination address. In some aspects, the status update notification, as well as other types of messages, may include information that is used by the computing device to identify and call a particular script to be executed. Thus, the computing engine 110 is configured to monitor messages 112 that are transmitted across the network 102. The computing engine 110 may monitor a plurality of the messages 112 in parallel for information that indicates one or more scripts to be executed.

The computing engine 110 can include a computing device such as a desktop, laptop, smartphone, server, and the like. The computing engine 110 can be configured to receive or access the messages 112 of the IP-Managed devices 106. The computing engine 110 may execute a container program that is used, in part, to create a management program that manages operation of the IP-Managed devices 106. For example, the computing engine 110 can execute a container program and monitor the messages 112 that are transmitted across the network 102. The computing engine 110 can filter the messages 114 to select a subset of messages that trigger execution of one or more scripts that the executed container program lacks (e.g., that are obtained from a database when needed by the container program).

The computing engine 110 examines each of the monitored messages 112, and filters the messages 114 using a filter. Separate filters can be configured for (or by) different network operators so that each different network operator can specify which types of messages trigger the computing engine 110 to take action. For example, one particular network operator may specify that a particular type of message can be ignored when received from devices (or a subset of the devices) it is managing, while a different network operator may specify that a particular script should be executed when that particular type of message is received from the devices managed by the different network operator. In this example, the filter for the particular network operator will cause the particular type of message to be ignored when received from the devices managed by the particular network operator, whereas the filter for the different network operator will trigger the computing engine 110 to take an action in response to receipt of the particular type of message.

In some implementations, the filters can be created using a matching function. The matching function can specify criteria that must be matched by a message in order for the message to trigger additional action by the computing engine 110. For example, the matching criteria can specify that a message type and/or device type match a pre-specified message type and/or device type in order for a particular action to be triggered. In operation, the computing engine 110 extracts, from the messages 112, the data required to determine whether the matching criteria are satisfied (e.g., whether the message type and/or device type match the pre-specified message type and/or device type), and compares the extracted data to the filtering criteria. When the extracted data matches (e.g., is the same as or within a specified range of) the filtering criteria, the computing engine 110 makes the determination that the filtering criteria have been satisfied, which triggers the computing device to take further action in response to receipt of the message. When there is no match between the extracted data and the filtering criteria, the computing engine 110 determines that the filtering criteria have not been satisfied, and ignores the message (e.g., takes no further action based on the message and/or discards the message). Note that filters can be configured such that the filtering criteria are satisfied when there is not a match between the data extracted from the message and the pre-specified criteria (e.g., when a channel ID of a device does not match a range of acceptable (or preferred) channel IDs, the filtering criteria that trigger a channel ID change can be satisfied).

When the filtering criteria have been matched by a message, the computing engine 110 takes further action based on receipt of the message. The further action can include the computing device identifying a particular script that is to be called (or executed) when the filtering criteria are satisfied (e.g., when a message containing particular information is received). In some aspects, scripts may be identified from an index of available scripts. For example, the computing engine 110 may be configured to analyze the messages 112 for activation events (e.g., events specifying that a telecommunications device has been activated or brought up on the network). In this example, the computing device can access an index to identify the particular script that is mapped to the activation event (and/or other contextual information), which indicates that the script is to be run when the activation event is identified in the monitored messages.

Other types of events can similarly trigger calls for different types of scripts or to provide information to other micro-services. For example, when the computing device receives a message identifying a channel ID for a particular device is not within a preferred set of channels (e.g., as specified in filtering criteria or as specified in a script that is called when an activation event is identified in a received message), a script that reconfigures the channel ID can be identified using the index (e.g., by identifying to scripts that are mapped to a particular type of information or message in the index).

Alternatively, or additionally, a previously obtained script (e.g., a script obtained when an activation event occurs) can provide information to one or more other locations (e.g., locations of micro-services) during execution of the script. For example, the computing engine 110 can evaluate a message associated with the previously obtained script, to determine information that may be posted to a peer computing engine (e.g., a peer computing device). The computing engine 110 can determine whether the message associated with the previously obtained script corresponds to a particular message type. If the message corresponds to the particular message type, the computing engine 110 performs a RPC post operation to a particular peer computing device. The RPC operation may include a query that gathers data from the particular peer computing device.

The computing engine 110 can merge the identified scripts with the container program, to create a management program that uses the identified scripts to manage operations of the IP-Managed devices 106. In some aspects, the management program generates and provides a response to the IP-Managed devices 106 and/or one or more peer computing engines 130. In this instance, the computing engine 110 can generate a response to a selected message. The response can be transformed into a particular format, and provided to a telecommunications device, such as the telecommunications device that provided the selected message. For example, the computing engine 110 may select a message that includes a configuration message associated with a particular telecommunications device. The computing engine 110 may identify a particular script in response to receipt of the selected message, and call the particular script to generate a configuration response 120 that indicates configuration information of the particular telecommunications device. The generated, configuration response 120 may be transformed into a format, such as a JavaScript Object Notation (JSON), and provided to the telecommunications device. In some aspects, the transformed format differs from a format of the initially received, or selected, message (i.e., the initial message is in XML format and the configuration response 120 is in JSON format).

In other aspects, the management program may be used by the computing engine 110 to generate and provide a query 122 to the IP-Managed devices 106 and/or peer computing engines 130. For example, the computing engine 110 may select a message indicating that performance data is available for a particular telecommunications device (i.e., the particular telecommunications device has gathered performance data over the past 15 minutes). The computing engine 110 can be configured to generate a query 122 to gather the performance data from the particular telecommunications device. As such, the generated query 122 may be transformed into a format suitable for the particular telecommunications device, and provided to the particular telecommunications device. In this instance, the particular telecommunications device may provide the performance data 132A to the computing engine 110 in response to receiving the query 122.

The computing engine 110 can further generate a response queue identifier and a response path uniform resource identifier address (URI) for each of the identified scripts 116. The computing engine 110 may perform an action associated with the response queue identifier and the response path URI address, such as providing a query 122 for additional data using a remote procedure call (RPC). The RPC call can be a query 122 that is provided to the one or more peer computing engines 130. The RPC call may include providing a query to the one or more peer computing engines 130 for configuration data 1326 that identifies a type of telecommunications device to be configured, a service to be configured, and/or an interface to be configured. As such, the one or more peer computing engines 130 may provide the additional data 132B to the computing engine 110 in response to the query 122.

Figure 2:
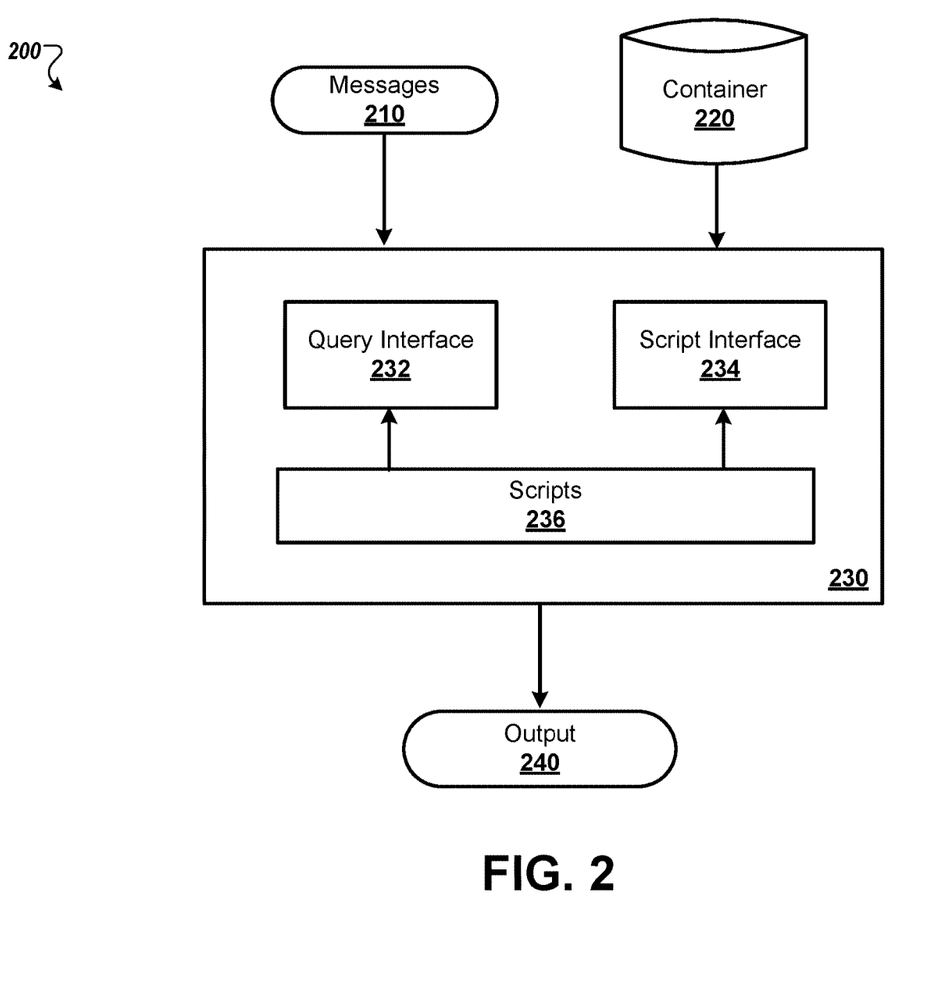
FIG. 2 is a diagram illustrating example of calling scripts to manage IP-Managed devices.

FIG. 2 is a diagram illustrating an example of calling scripts to manage IP-Managed devices 200. The diagram 200 illustrates a computing device 230 that is configured to monitor messages 210 sent between IP-Managed devices (e.g., telecommunications devices). The computing device 230 can manage the IP-Managed devices by monitoring and filtering transmitted messages 210. The computing device 230 may monitor and filter the messages 210 using a network interface that facilitates communication between the IP-Managed devices and a cloud platform. For example, the computing device 230 can execute a container program 220 to selectively filter messages that trigger execution of one or more scripts 236 in an index of scripts, to store selected messages and disregard non-selected messages.

The computing device 230 may identify a particular script associated with each of the selected messages using a script interface 234. In some aspects, the computing device 230 uses the script interface 234 to filter the messages 210 and identify scripts associated with each selected message in parallel. For example, the computing device 230 may selectively filter five messages out of a plurality of received messages 210. The computing device 230 may identify a particular script for each of the five selected messages, and merge the identified scripts with the container program for managing telecommunications devices associated with the selected messages. In some aspects, the corresponding scripts may be identified and merged with the container program in parallel.

The computing device 230 may identify the particular scripts from the index of scripts 236. For example, the computing device 230 may identify a topology configuration script for a first selected message. In this instance, the topology configuration script may be executed in response to receipt of the first selected message. The topology configuration script may be called to aid in the configuration of a communications topology of a first telecommunications device. Specifically, the topology configuration script may be merged with the container program 220 to effectively manage the first telecommunications device.

In another example, the computing device 230 may identify an event relay script for a second selected message. In this instance, the event relay script may be executed in response to receipt of the second selected message. The event relay script may be called to aid in the determination of whether an event, (i.e., when a telecommunications device changes from an ON state to an OFF state), should be processed for a second telecommunications device. Specifically, the event relay script may be merged with the container program 220 to effectively manage the second telecommunications device.

In another example, the computing device 230 may identify a channel identification script for a third selected message. In this instance, the channel identification script may be executed in response to receipt of the third selected message. The channel identification script may be called to aid in the configuration of selecting a preferred transmission channel for a third telecommunications device. Specifically, the channel identification script may be merged with the container program 220 to effectively manage the third telecommunications device.

In another example, the computing device 230 may identify a performance identification script. In this instance, the performance identification script may be executed in response to receipt of the fourth selected message. The performance identification script may be called to aid in querying for performance data of a fourth telecommunications device. Specifically, the performance identification script may be merged with the container program 220, using the query interface 232, to generate and provide a query the fourth telecommunications device for performance data.

In another example, the computing device 230 may identify an alarm response script for a fifth selected message. In this instance, the alarm response script for a fifth selected message may be executed in response to receipt of the fifth selected message. The alarm response script may be called to aid in responding to an alarm notification provided by a fifth telecommunications device. Specifically, the alarm response script may be merged with the container program 220 to effectively generate and provide a response to the message that indicates the alarm of the fifth telecommunications device.

The computing device 230 may be configured to merge the identified scripts with the executed container program 220 to generate output 240. The output 240 may include responses such as configuration responses and/or queries to the selected messages.

In some aspects, the computing device 230 generates an object notation, such as a plugin notation (PIN), for the output 240. The object notation may correspond to a service request. The computing device 230 can be configured to extract strings and/or values from the selected messages, and render the object notation using the extracted strings and/or values. In this instance, the object notation may be rendered as an output JSON that is required to perform the request service. The output 240 may be provided to one or more telecommunications devices or peer computing devices for execution. For example, the computing device 230 can provide a rendered JSON, that corresponds to a query for performance data, to a particular telecommunications device as output 240.

Figure 3:
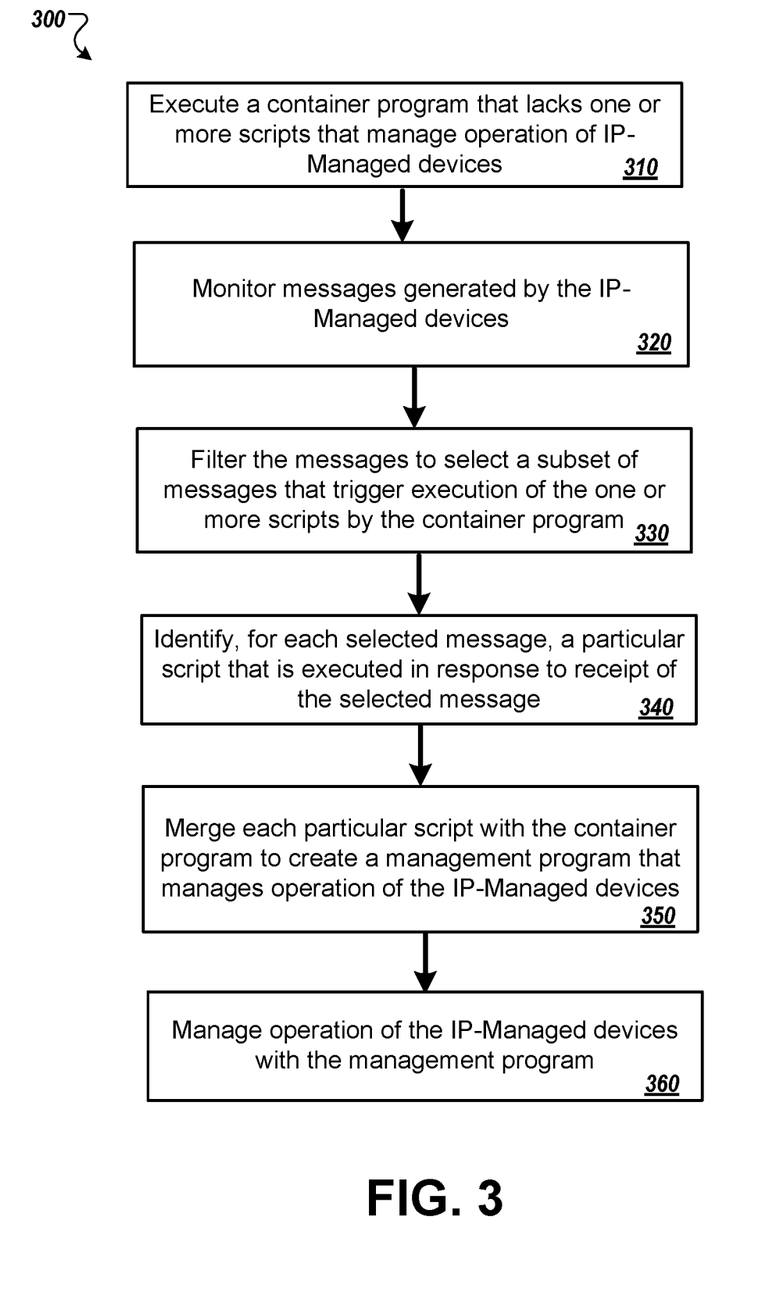
FIG. 3 is a flow chart illustrating an example process for managing operation of IP-Managed devices.

FIG. 3 is a flow chart illustrating an example process 300 for managing operation of IP-Managed devices. The process 300 can be performed by one or more servers or other computing devices. For example, operations of process 300 can be performed by computing engine 110 of FIG. 1. Operations of the process 300 can also be implemented as instructions stored on a non-transitory computer readable medium, and when the instructions are executed by one or more servers (or other computing devices) the instructions cause the one or more servers to perform operations of the process 300.

At step 310, a computing device executes a container program that lacks one or more scripts that manage operation of IP-Managed devices (e.g., telecommunications devices). The computing device can execute a container program that includes a mapping of script-to-message type dependencies. The container program can be updated with scripts to manage operation of the IP-Managed devices. The container program can be reconfigured for different customer applications associated with the IP-Managed devices. Further, the container program can be dynamically reconfigured using scripts that the container program initially lacks, without recompiling the container program.

At step 320, the computing device monitors messages generated by the IP-Managed devices. The computing device can be configured to monitor the messages generated by the IP-Managed devices in parallel. In some aspects, the computing device receives messages from the IP-Managed devices directly. In other aspects, the computing device "listens-in" on the transmitted messages. As such, the computing device can be configured to receive and/or access data that is exchanged across a plurality of IP-Managed devices that interact with a cloud platform.

At step 330, the computing device filters the messages to select a subset of messages that trigger execution of the one or more scripts by the container program. The computing device can select a first subset of messages that are identified to trigger execution of scripts, and can disregard all other messages. In some aspects, the computing device filters the messages in parallel. The computing device can be configured to process messages of a variety of different formats, (i.e., JSON, XML, etc.). The computing device can be configured to select the subset of messages based on data extracted from the messages. For example, the computing device can be configured to extract a message type from each message, and filter the messages to select only messages that indicate a particular message type.

At step 340, the computing device identifies, for each selected message, a particular script that is executed in response to receipt of the selected message. In some aspects, the computing device identifies a particular script for each of the selected messages in parallel. The computing device can be configured to match each selected message to a particular script that the container program lacks. In some aspects, the computing device matches the selected messages to scripts using the mapping of script-to-message type dependencies. For example, the computing device may identify a particular script that can be called to adjust a parameter of a telecommunication device that transmitted a message associated with the identified script. The computing device can be configured to identify the particular script for each selected message based on a message type, such as a channel identification message, a topology message, an alarm message, an event notification message, and the like.

In some aspects, the computing device evaluates each of the selected messages to determine whether or not the selected messages may be matched to a particular script in a script index. The scripts may correspond to programs that are executed to process and forward information contained in the messages. Additionally, or alternatively, the scripts may correspond to programs that are executed to generate a query that requests additional information associated with the IP-Managed devices.

At step 350, the computing device merges each particular script with the container program to create a management program that manages operation of the IP-Managed devices. The computing device can merge one or more of the identified scripts with the container program to create the management program. If a plurality of scripts are identified for the selected messages, the scripts may be merged with the container program in parallel. The computing device can reconfigure the container program with the identified scripts so that operation of the IP-Managed devices may be managed. In some aspects, the computing device verifies a syntax of the management program. In this instance, the computing device performs one or more syntactic checks during the process of merging the container program with the one or more identified scripts. The computing device may perform the syntactic checks during the creation of the management program, as well as during the identification of each of the scripts that correspond to the selected messages.

At step 360, the computing device manages operation of the IP-Managed devices with the management program. The computing device can be configured to manage operation of the IP-Managed devices in parallel. In some aspects, the computing device calls the identified scripts to manage operation of the IP-Managed devices. The computing device may generate a response for each selected message. The response may include a configuration response for a selected message, a query corresponding to a selected message, or any combination thereof. For example, the computing device may generate a configuration response to a particular message, transform the configuration response into a particular format, (i.e., JSON), and provide the configuration response as output to one or more telecommunications devices or peer computing devices. In another example, the computing device generates a query corresponding to a particular message, transforms the query into a particular format, (i.e., JSON), and provides the query as output to one or more telecommunications devices or peer computing devices.

Figure 4:
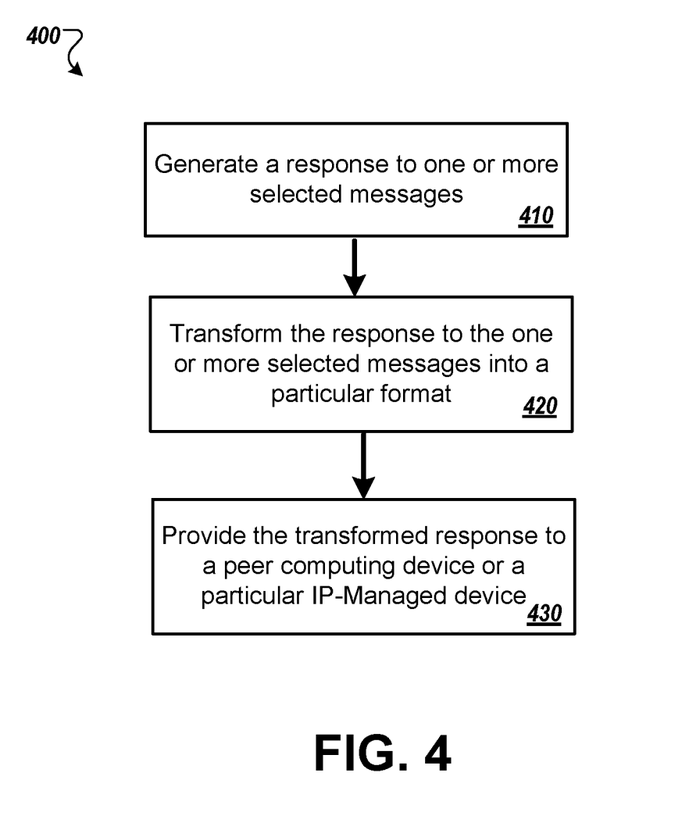
FIG. 4 is a flow chart illustrating an example process for providing transformed responses.

FIG. 4 is a flow chart illustrating an example process 400 for providing transformed responses. The process 400 can be performed by one or more servers or other computing devices. For example, operations of process 400 can be performed by computing engine 110 of FIG. 1. Operations of the process 400 can also be implemented as instructions stored on a non-transitory computer readable medium, and when the instructions are executed by one or more servers (or other computing devices) the instructions cause the one or more servers to perform operations of the process 400.

At step 410, a computing device generates a response to one or more selected messages. The computing device can be configured to generate a response for each of the selected messages in parallel. In some aspects, the generated response includes a configuration response that modifies one or more parameters of a particular IP-Managed device (e.g., a particular telecommunication device). For example, the computing device may receive a message that indicates an initial channel identifier (ID) used by a particular telecommunications device. The computing device may generate a configuration response indicating a new channel ID for the particular telecommunications device to use. In this instance, the new channel ID may correspond to a preferred channel for data transmission (in comparison to a randomized, initial channel ID).

The computing device can be configured to generate a response including a query that gathers data from peer computing devices or the telecommunications devices. For example, the computing device may receive a message that indicates performance data, (i.e., information collected over the past day), is available for a particular telecommunications device. In this instance, the computing device can be configured to generate a query that gathers the performance data from the particular telecommunications device.

At step 420, the computing device transforms the response to the one or more selected messages into a particular format. The computing device can be configured to transform the generated response into a particular format. The transformation of responses permits the computing device to dynamically update or adjust code of the management program in real time, or near-real time. Further, the computing device transforms the response so that a recipient of the response may easily read and/or modify the response accordingly.

In some aspects, the computing device is configured to transform the response such that the response is in a different format than that of the selected messages. For example, the computing device may receive messages in XML format, and generate corresponding responses in the XML format. The computing device can transform the generated responses from XML format to JSON format. In certain aspects, the computing device transforms the response to the one or more selected messages into the particular format using a plugin notation, an object notation, or any other notation that is required to transform the response into a format suitable for the recipient to process the response.

At step 430, the computing device provides the transformed response to a peer computing device or a particular IP-Managed device (e.g., a particular telecommunication device). The computing device can be configured to provide the transformed response to one or more peer computing devices, one or more telecommunications devices, or any combination thereof. The computing device may provide the transformed response as output to the peer computing device or the particular telecommunications device so that a corresponding service request is to be fulfilled by the peer computing device or the particular telecommunications device. In some aspects, the computing device provides the transformed response to the particular telecommunications device so a parameter of the telecommunications device may be adjusted based on the response. In other aspects, the computing device provides the transformed response to the peer computing device so that a corresponding microservice may gather and/or provide additional data associated with a telecommunications device.

For purposes of illustration, the following paragraphs provide a specific example of managing operation of IP-Managed devices. The following description is exemplary and not intended to limit the scope of the disclosure. In an example, scripts can be configured to execute an ONT tune out script when an onu-activate event is received. The input JSON shown below will be used as a representative example of a received activate event.

```
{
  "[EXAMPLE_MANUFACTURER-XPON:ONU_ACTIVATE]":{
    "sequence-number":"2",
    "date-and-time":"2016-10-12T22:39:12-00:00",
    "subscription-id":"test_sub",
    "entity-ref":"ONU0_0",
    "[ENTITY-TYPE]":"[[example_manufacturer-
      entities:example_manufacturer-entity]]",
    "event-severity":"informational",
    "onu-id":0,
    "xpon-mac-id":0,
    "channel-id":4,
    "serial-number":"QURUTjEwMDA=",
    "registration-id":""
  }
}
```

The scripts that are executed in response to receipt of the activate event may use dot-notation to associate hierarchical dotted-key names with values extracted from input JSON data objects. Using the JSON above, a script (or plugin) could extract the following dotted-key/value pair:

```
<[EXAMPLE_MANUFACTURER-XPON:ONU-ACTIVATE.ENTITY-TYPE]> equals
"[[example_manufacturer-entities:example_manufacturer-entity]]"
```

The variables enclosed above with "<" and ">" symbols are replaced with values contained in the input JSON of the activate event. In this instance, the variable name is shown in all upper case characters and single brackets to distinguish the variable name from the value of each respective variable, which is shown and in all lower case characters and double brackets.

As shown below, the script is configured to perform a query, such as the RPC POST operation "onu-interface"), when a received input message includes an input JSON data object named [EXAMPLE_MANUFACTURER:ONU-ACTIVATE.ENTITY-TYPE] that matches "[[example_manufacturer-entities:example_manufacturer-entities:example_manufacturer-entity]]":

```
{
  "query":{
    "onu-interface":{
      "match":[
        "<[EXAMPLE_MANUFACTURER-XPON:ONU-ACTIVATE.ENTITY-TYPE]> ==
          [[example_manufacturer-entities:example_manufacturer-entity]]"
      ],
      "operation":"POST",
      "queue":"example_queue.interfacemanager.api",
      "uri":"/restconf/data-filter/example_manufacturer-cloud-platform-
          interfaces:interfaces/interface",
      "body":"{\"subtended-device-name\":\"<example_manufacturer-
          xpon:onu-activate.entity-ref>\"}"
    }
  }
}
```

When a match is determined to be present, the script is executed to perform a RPC POST operation to a remote interface-manager micro-service using the specified queue name and uniform resource identifier (URI) address. The body of the JSON message is sent to the interface_manager as a sparsely defined data filter named "subtended-device-name". In the body of the object, dotted-key variable "<[EXAMPLE_MANUFACTURER-XPON:ONU_ACTIVATE].entity-ref>" is replaced with the value "ONU0_0", which is extract from the input JSON. This is an example in which the computing engine 110 from FIG. 1 can provide information to a peer computing device in response to receipt of a message from a telecommunications device that is being managed by the computing engine 110.

After performing queries, the script attempts to match actions to render the output JSON required to perform the requested service. The action's matching criteria shown below include (i) the same matching criterion used for the query, and (ii) a run-time evaluation of whether the channel identifier for the ONT ([EXAMPLE_MANUFACTURER-XPON:ONU_ACTIVATE].channel-id) is greater than the ONU interface's lower layer channel, (i.e., bitwise AND operation between the lower layer channel that is retrieved from the interface-manager and the value 255, or 0xFF).

```
{
  "action":{
    "pon-onu-tune-out":{
      "match":[
        "<[EXAMPLE_MANUFACTURER:ONU-ACTIVATE.ENTITY-TYPE]> ==
          exampe_manufacturer-entities:example_manufacturer-
          entities:example_manufacturer-entity",
        "EVAL[ (<[EXAMPLE_MANUFACTURER-XPON:ONU_ACTIVATE].channel-
          id>) > (<onu-interface.lower-layer-
          interfaces[0].channel> & 255) ]"
      ],
      "render":[
        {
          "model":"pon-onu-tune-out + script-exec-response-queue",
          "destination":"script-exec"
        }
      ]
    }
  }
}
```

If all matching criteria are found to be true, the "pon-onu-tun-out" and "script-exec-response-queue" models shown below are merged together and a corresponding rendered JSON is posted to the configurable script-exec destination. In this instance, the script expects a 200 (OK) HTTP status code response, or any sort of response in the "2xx Successful" range.

```
{
  "model":{
    "pon-onu-tune-out":[
      "{\"device-name\": \"[EXAMPLE_MANUFACTURER:ONU-
        ACTIVATE].entity-ref>\"}",
      "{\"script\": \"pon-onu-tune-out\"}",
      "{\"onu-name\": \"onu <[EXAMPLE_MANUFACTURER:ONU-
        ACTIVATE].onu-id>\"}",
      "{\"target-channel-pair-name\": \"channel-
        pair <[EXAMPLE_MANUFACTURER:ONU-ACTIVATE].channel-id>\"}"
    ],
```

```
        "script-exec-response-queue":[
            "{\"resp_queue\": \"example_queue.cloud-platform-event-
                relay.<resp_queue>\"}",
            "{\"resp_path\": \"/notifications/cloud-platform-event-
                relay:script-complete=<resp_path>\"}"
        ]
    },
    "destination":{
        "script-exec":{
            "operation":"POST",
            "queue":"example_queue.scriptexec.api",
            "uri":"/restconf/operations/example_manufacturer-captive-
                portal:script-exec"
        }
    }
}
```

As shown below, the output JSON for this example can be rendered using strings and values extracted from the input JSON and the RPC. For concurrency, a UUID is generated at run-time for the response queue and path URI.

```
{
  "device-name": "ONU0_0",
  "script": "pon-onu-tune-out",
  "onu-name": "onu 0",
  "target-channel-pair-name": "channel-pair 4",
  "resp_queue": "example_queue.cloud-platform-event-relay.{generated UUID}",
  "resp_path"; "/notifications/cloud-platform-event-relay:script-complete={generated UUID}"
}
```

For reference, the complete notation used in the example is shown below:

```
{
  "com.example_manufacturer.marshal-plugins":{
    "query":{
      "onu-interface":{
        "match":[
          "<example_manufacturer-xpon:onu-activate.entity-type> ==
              example_manufacturer-entities: example_manufacturer-entity"
        ],
        "operation":"POST",
        "queue":"example_queue.interfacemanager.api",
        "uri":"/restconf/data-filter/example_manufacturer-cloud-
              platform-interfaces:interfaces/interface",
        "body":"{\"subtended-device-name\":\"<example_manufacturer-
                  xpon:onu-activate.entity-ref>\"}"
      }
    },
    "action":{
      "pon-onu-tune-out":{
        "match":[
          "<example_manufacturer-xpon:onu-activate.entity-type> ==
              example_manufacturer-entities: example_manufacturer-entity",
          "EVAL[ (<[EXAMPLE_MANUFACTURER-XPON:ONU_ACTIVATE].channel-id>) >
              (<onu-interface.lower-layer-interfaces[0].channel> & 255) ]"
        ],
        "render":[
          {
            "model":"pon-onu-tune-out + script-exec-response-queue",
            "destination":"script-exec"
          }
        ]
      }
    },
    "model":{
      "pon-onu-tune-out":[
        "(\"device-name\": \"<example_manufacturer-xpon:onu-
                  activate.entity-ref>\"}",
        "{\"script\": \"pon_onu_tune_out\"}",
```

```
        "{\"onu-name\": \"onu <example_manufacturer-xpon:onu-
                    activate.onu-id>\"}",
        "{\"target-channel-pair-name\": \"channel-pair
            <example_manufacturer-xpon:onu-activate.channel-id>\"}"
    ],
    "script-exec-response-queue":[
        "{\"resp_queue\": \"example_queue.cloud-platform-event-
                    relay.<resp_queue>\"}",
        "{\"resp_path\": \"/notifications/cloud-platform-event-
                    relay:script-complete=<resp_path>\"}"
    ]
},
"destination":{
    "script-exec":{
        "operation":"POST",
        "queue":"example_queue.scriptexec.api",
        "uri":"/restconf/operations/example_manufacturer-
            captive-portal:script-exec"
        }
    }
  }
}
```

Figure 5:
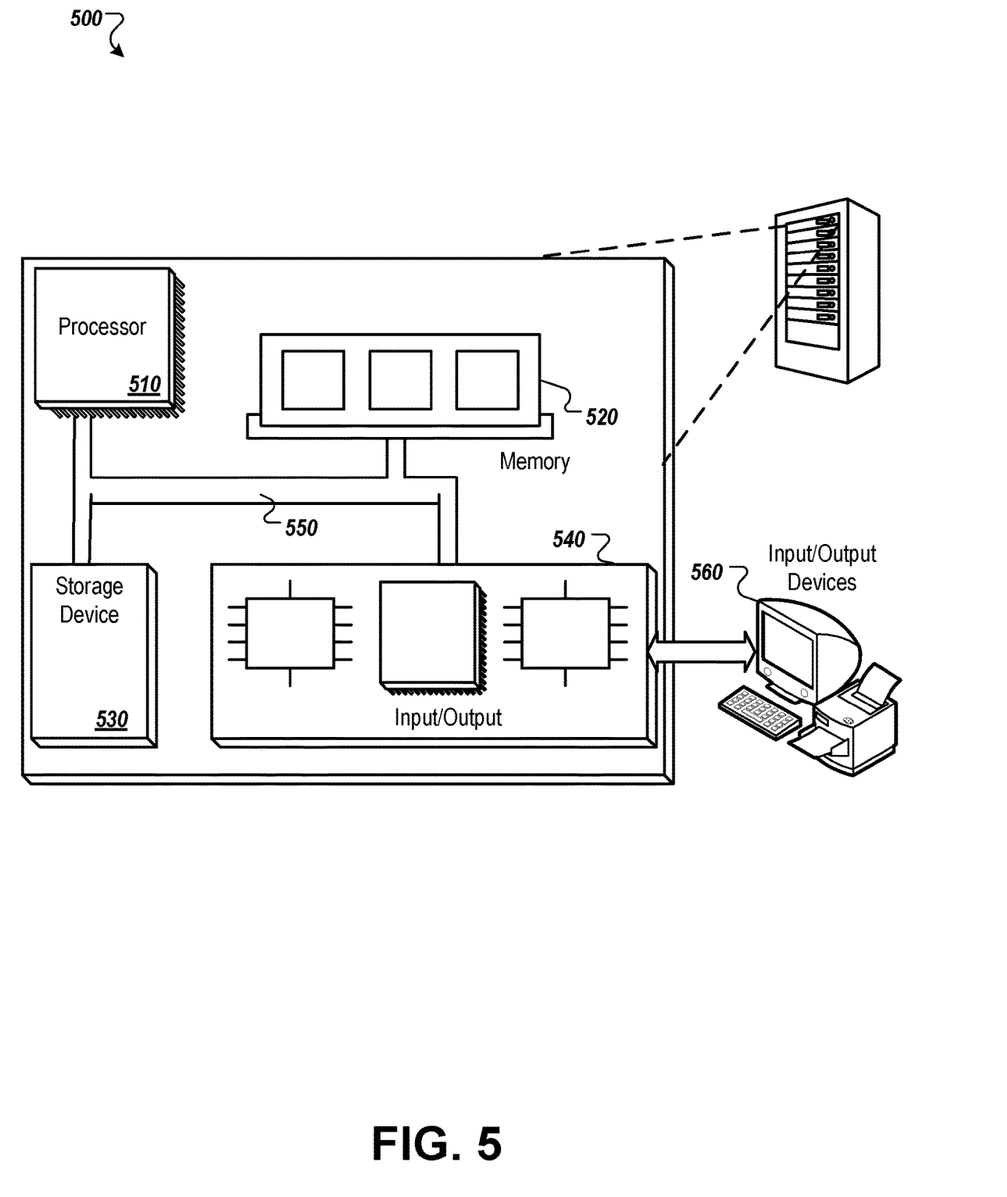
FIG. 5 is block diagram of an example computing device.

FIG. 5 is block diagram of an example computing system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method, comprising:
    executing, by one or more computing devices, a container program that lacks one or more scripts that manage operation of telecommunications devices that interact with a cloud platform;
    monitoring, by the one or more computing devices, a plurality of messages generated by the telecommunications devices that interact with the cloud platform;
    filtering, by the one or more computing devices, the plurality of messages to select, from the plurality of messages, a subset of messages that trigger execution of the one or more scripts by the container program;
    identifying, for each selected message in the subset of messages and from an index of available scripts, a particular script that is executed in response to receipt of the selected message, wherein different particular scripts are identified for different message types;
    merging each particular script with the container program to create a management program that manages operation of the telecommunications devices based on the subset of messages; and managing, by the one or more computing devices, operation of the telecommunications devices with the management program.

2. The method of claim 1, wherein managing operation of the telecommunications devices comprises:
generating a response to one or more of the selected messages in the subset of messages;
transforming the response to the one or more of the selected messages into a particular format; and
providing the transformed response to the one or more of the selected messages to one or more of a peer computing device or a particular telecommunications device.

3. The method of claim 2, wherein the response to the one or more selected messages includes a configuration response that modifies one or more parameters of the particular telecommunications device.

4. The method of claim 2, wherein the response to the one or more selected messages includes a query that gathers data from one or more of the peer computing device or the particular telecommunications device.

5. The method of claim 1, wherein monitoring the plurality of messages generated by the telecommunications devices that interact with the cloud platform comprises obtaining the plurality of messages through a network interface that facilitates communication between the telecommunications devices and the cloud platform.

6. The method of claim 1, wherein filtering the subset of messages that trigger execution of the one or more scripts by the container program comprises selectively storing the subset of messages that trigger execution of the one or more scripts by the container program and discarding other received messages.

7. The method of claim 1, wherein identifying the particular scripts that are executed in response to receipt of the selected messages comprises identifying the particular scripts that are executed in response to receipt of the selected messages in parallel.

8. The method of claim 1, wherein identifying a particular script that is executed in response to receipt the selected message comprises identifying at least one of a topology configuration script, an event relay script, a channel identification script, a telecommunication device performance identification script, or an alarm response script.

9. The method of claim 1, wherein merging, for each selected message in the subset of messages and from an index of available scripts, the particular script that is executed in response to receipt of the selected message comprises generating, for each particular script, an object notation that corresponds to a service request.

10. The method of claim 9, comprising, in response to generating the object notation that corresponds to the service request, rendering the object notation using strings and values extracted from the subset of messages that trigger execution of the one or more scripts by the container program.

11. The method of claim 10, wherein managing operation of the telecommunications devices with the management program comprises providing the rendered object notation that corresponds to the service request to one or more a peer computing device or a particular telecommunications device for execution.

12. The method of claim 1, comprising:
generating, for each particular script, (i) a response queue identifier and (ii) a response path uniform resource identifier (URI) address; and
performing an operation associated with a micro-service using (i) the response queue identifier and (ii) the response path URI address.

13. The method of claim 12, wherein performing the operation associated with the micro-service using (i) the response queue identifier and (ii) the response path URI address comprises performing a remote procedure call (RPC) to one or more peer computing devices that provide the micro-service with data that identifies a type of telecommunications device to be configured, a service to be configured, and an interface to be configured.

14. The method of claim 1, wherein monitoring the plurality of messages generated by the telecommunications devices that interact with the cloud platform comprises extracting, for at least one of the plurality of messages, data identifying a type of telecommunications device to be configured, a service to be configured, and an interface to be configured.

15. A system, comprising:
multiple telecommunications devices that interact with a cloud platform; and
one or more computing devices in communication with the telecommunications devices and one or more storage devices storing instructions that are operable, when executed by the one or more computing devices, to cause the one or more computers to perform operations comprising:
executing a container program that lacks one or more scripts that manage operation of the telecommunications devices that interact with the cloud platform;
monitoring a plurality of messages generated by the telecommunications devices that interact with the cloud platform;
filtering the plurality of messages to select, from the plurality of messages, a subset of messages that trigger execution of the one or more scripts by the container program;
identifying, for each selected message in the subset of messages and from an index of available scripts, a particular script that is executed in response to receipt of the selected message, wherein different particular scripts are identified for different message types;
merging each particular script with the container program to create a management program that manages operation of the telecommunications devices based on the subset of messages; and
managing operation of the telecommunications devices with the management program.

16. The system of claim 15, wherein the operation of managing operation of the telecommunications devices with the management program comprises:
generating a response to one or more of the selected messages in the subset of messages;
transforming the response to the one or more of the selected messages into a particular format; and
providing the transformed response to the one or more of the selected messages to one or more of a peer computing device or a particular telecommunications device.

17. The system of claim 15, wherein the operation of merging, for each selected message in the subset of messages and from an index of available scripts, the particular script that is executed in response to receipt of the selected message comprises generating, for each particular script, an object notation that corresponds to a service request.

18. A non-transitory computer storage medium encoded with a computer program, the program comprising instructions that when executed by data processing apparatus cause the data processing apparatus to perform operations comprising:
- executing a container program that lacks one or more scripts that manage operation of telecommunications devices that interact with a cloud platform;
- monitoring a plurality of messages generated by the telecommunications devices that interact with the cloud platform;
- filtering the plurality of messages to select, from the plurality of messages, a subset of messages that trigger execution of the one or more scripts by the container program;
- identifying, for each selected message in the subset of messages and from an index of available scripts, a particular script that is executed in response to receipt of the selected message, wherein different particular scripts are identified for different message types;
- merging each particular script with the container program to create a management program that manages operation of the telecommunications devices based on the subset of messages; and
- managing operation of the telecommunications devices with the management program.

19. The non-transitory computer storage medium of claim 18, wherein the operation of managing operation of the telecommunications devices with the management program comprises:
- generating a response to one or more of the selected messages in the subset of messages;
- transforming the response to the one or more of the selected messages into a particular format; and
- providing the transformed response to the one or more of the selected messages to one or more of a peer computing device or a particular telecommunications device.

20. The non-transitory computer storage medium of claim 18, wherein the operation of merging, for each selected message in the subset of messages and from an index of available scripts, the particular script that is executed in response to receipt of the selected message comprises generating, for each particular script, an object notation that corresponds to a service request.

* * * * *